(12) United States Patent
Kang et al.

(10) Patent No.: US 11,471,802 B2
(45) Date of Patent: Oct. 18, 2022

(54) FILTER ASSEMBLY FOR WATER PURIFIER

(71) Applicant: SAMSUNG ELECTRONICS CO., LTD., Suwon-si (KR)

(72) Inventors: Wan-Ku Kang, Suwon-si (KR); Jung-Geun Lee, Suwon-si (KR); Jongho Lee, Suwon-si (KR); Moohyung Lee, Suwon-si (KR); Yeonwoo Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 16/846,963

(22) Filed: Apr. 13, 2020

(65) Prior Publication Data

US 2020/0324231 A1    Oct. 15, 2020

(30) Foreign Application Priority Data

Apr. 11, 2019    (KR) .................... 10-2019-0042466

(51) Int. Cl.
*B01D 29/13*    (2006.01)
*B01D 35/30*    (2006.01)

(52) U.S. Cl.
CPC ........... *B01D 35/306* (2013.01); *B01D 29/13* (2013.01); *B01D 2201/0423* (2013.01);
(Continued)

(58) Field of Classification Search
CPC ................. B01D 35/306; B01D 29/13; B01D 2201/0423; B01D 2201/347;
(Continued)

(56) References Cited

U.S. PATENT DOCUMENTS

2003/0178356 A1    9/2003    Bartkus et al.
2008/0185330 A1    8/2008    Sinur et al.
(Continued)

FOREIGN PATENT DOCUMENTS

EP          2206543          7/2010
KR    10-2012-0055445          5/2012
(Continued)

OTHER PUBLICATIONS

Extended European Search Report dated Jul. 27, 2020 in European Patent Application No. 20168666.4.
(Continued)

*Primary Examiner* — Waqaas Ali
(74) *Attorney, Agent, or Firm* — Staas & Halsey LLP

(57) ABSTRACT

A filter assembly includes a filter holder into which a part of the filter is insertable, and a lock mounted to the filter holder and configured to lock and release the filter to and from the filter holder. The lock includes a guide coupled to the filter holder and configured to be linearly movable to transmit a force in a direction into which the filter is inserted, a pusher configured to transmit a force in a direction opposite to the direction, into which the filter is inserted, by an elastic member, a stopper rotatably received in the pusher to be arranged between the pusher and the guide, and configured to linearly move the filter holder by being linearly moved by the guide and the pusher, and a cam configured to lock and release the filter to and from the filter holder by guiding rotation and linear movement of the stopper.

19 Claims, 19 Drawing Sheets

(52) U.S. Cl.
CPC ............... *B01D 2201/347* (2013.01); *B01D 2201/4007* (2013.01); *B01D 2201/4046* (2013.01)

(58) Field of Classification Search
CPC .... B01D 2201/4007; B01D 2201/4046; B01D 2201/4061; B01D 2201/303; B01D 27/02; B01D 2201/4076; B01D 2201/4023; B01D 2201/302; C02F 1/003
See application file for complete search history.

(56) References Cited

U.S. PATENT DOCUMENTS

| | | |
|---|---|---|
| 2013/0228503 A1 | 9/2013 | Baumann et al. |
| 2018/0334402 A1 | 11/2018 | Williams et al. |

FOREIGN PATENT DOCUMENTS

| | | | | |
|---|---|---|---|---|
| KR | 20120055445 A | * | 5/2012 | |
| KR | 10-1326699 | | 11/2013 | |
| KR | 10-1572918 | | 11/2015 | |
| KR | 10-1590849 | | 1/2016 | |
| WO | 2010/033470 | | 3/2010 | |
| WO | WO-2010033470 A2 | * | 3/2010 | ........... B01D 35/153 |
| WO | 2018/067437 | | 4/2018 | |

OTHER PUBLICATIONS

International Search Report dated Aug. 21, 2020 in International Patent Application No. PCT/KR2020/004895.

* cited by examiner

FILTER ASSEMBLY FOR WATER PURIFIER

CROSS-REFERENCE TO RELATED APPLICATION(S)

This application is based on and claims priority under 35 U.S.C. § 119 to Korean Patent Application No. 10-2019-0042466, filed on Apr. 11, 2019, in the Korean Intellectual Property Office, the disclosure of which is herein incorporated by reference in its entirety.

BACKGROUND

1. Field

The disclosure relates to a filter assembly for a water purifier configured to easily assemble and disassemble a filter.

2. Description of Related Art

In general, water purifiers are widely used for home use as a device for filtering water to remove impurities.

Water purifiers are classified according to the purpose, configuration, water purification method, etc., and the natural filtration type and the direct filtration type water purifiers mainly used may employ a purification method using a filter, and thus these are referred to as filter type water purifiers, for convenience.

In general, a filter type water purifier provides purified water through a process of water input, filtration, adsorption, main filtration and water output.

Accordingly, as for the filter type water purifier, a filtration filter is used in the filtration process in which raw water such as tap water is input and impurities contained in the input tap water is filtered out.

Therefore, because the performance of the water purifier depends on proper maintenance of the filter, the filter needs to be replaced every predetermined period.

SUMMARY

Therefore, it is an aspect of the disclosure to provide a filter assembly for a water purifier capable of easily assembling and disassembling a filter.

Additional aspects of the disclosure will be set forth in part in the description which follows and, in part, will be apparent from the description, or may be learned by practice of the disclosure.

In accordance with an aspect of the disclosure, a filter assembly for a water purifier includes a filter holder into which a part of a filter is insertable, and a lock mounted to the filter holder and configured to lock the filter to the filter holder and release the filter from the filter holder. The lock includes a guide coupled to the filter holder and configured to be linearly movable to transmit a force in a direction into which the filter is inserted, a pusher including an elastic member, and the pusher configured to transmit a force in a direction opposite to the direction, into which the filter is inserted, by the elastic member, a stopper rotatably received in the pusher to be arranged between the pusher and the guide, and configured to linearly move the filter holder by being linearly moved by the guide and the pusher, and a cam configured to lock the filter to the filter holder or release filter from the filter holder by guiding rotation and linear movement of the stopper.

The lock may further include a housing in which the pusher is received to be linearly movable.

The housing may include an inlet tube through which water is introduced to the filter when the filter is inserted into the filter holder, an outlet tube through which the introduced water is filtered by the filter and discharged from the filter when the filter is inserted into the filter holder, a plurality of support protrusions on which one side of the elastic member is supported, and a plurality of cam holes to which the cam is coupled.

The filter may include an insert inserted into the filter holder, an inlet connected to the inlet tube, an outlet connected to the outlet tube, and a positioning hole configured to select a position, in which the filter is coupled to the filter holder, so as to connect the inlet to the inlet tube and to connect the outlet to the outlet tube.

The filter holder may include a fixing part to which the insert is inserted and attachable to or detachable from the filter holder, a first connection tube configured to connect the inlet tube to the inlet, a second connection tube configured to connect the outlet tube to the outlet; an O-ring respectively provided on an outer circumferential surface of the first connection tube inserted into the inlet, so as to seal between the inlet and the first connection tube and on an outer circumferential surface of the second connection tube inserted into the outlet, so as to seal between the outlet and the second connection tube, a positioning protrusion inserted into the positioning hole, and a plurality of guide coupling holes coupled to the guide.

The fixing part may be elastically deformable and thus when the fixing part is received in an inside of the cam, the filter may be locked to the fixing part, and when the fixing part is exposed to an outside of the cam, the filter may be released from the fixing part.

The guide may include a plurality of filter holder coupling holes coupled to the filter holder, a contact part in contact with the stopper to linearly move the stopper, a plurality of first guide protrusions formed on an inner circumferential surface of the guide to guide the linear movement of the guide, and a plurality of second guide protrusions formed on an outer circumferential surface of the guide to guide the linear movement of the guide.

The contact part may be formed by a plurality of uneven parts including an inclined surface.

The pusher may include a plurality of support grooves on which the other side of the elastic member is supported, a pressing part in contact with the stopper to press the stopper so as to allow the stopper to be linearly moved in the direction opposite to the direction into which the filter is inserted, and a plurality of guide parts configured to guide linear movement of the plurality of first guide protrusions.

The stopper may include a pressed surface pressed by the pressing part, a plurality of guide bars configured to rotate and linearly move the stopper by being guided by the cam, and an inclined part formed at an end of the guide bar so as to be in contact with the contact part and provided with an inclined surface having an angle corresponding to the inclined surface of the contact part.

The cam may include a plurality of housing coupling holes coupled to the plurality of cam coupling holes, a pusher guide received in the inside of the pusher to guide the pusher so as to allow the pusher to linearly moved, a plurality of guide grooves formed on an inner circumferential surface of the cam to guide linear movement of the plurality of guide bars, and a plurality of rotation guides formed among each of the plurality of guide grooves to guide the plurality of guide bars so as to allow the stopper to be rotated.

Each of the plurality of rotation guides may include a plurality of rotating inclined surfaces provided with an inclined surface having an angle corresponding to the inclined surface formed on the contact part and the inclined part, the plurality of rotating inclined surfaces configured to guide the stopper to allow the stopper to be rotated toward one direction.

The plurality of rotating inclined surfaces may include a first rotating inclined surface connected to the guide groove in a direction in which the stopper is rotated, and a second rotating inclined surface spaced apart from the first rotating inclined surface in the direction in which the stopper is rotated.

Each of the plurality of rotation guides may include a movement stopper formed between the first rotating inclined surface and the second rotating inclined surface so as to stop the rotation of the stopper rotated along the first rotating inclined surface and so as to prevent the linear movement of the stopper toward the direction opposite to the direction into which the filter is inserted.

The movement stopper may include a guide groove part configured to guide the linear movement of the plurality of second guide protrusions, together with the plurality of guide grooves.

In accordance with another aspect of the disclosure, a filter assembly for a water purifier includes a filter holder into which a part of the filter is inserted, and a lock mounted to the filter holder, and configured to lock the filter to the filter holder based on movement of the filter holder in a direction into which the filter is inserted and configured to release the filter from the filter holder based on movement of the filter holder in a direction opposite to the direction into which the filter is inserted. The lock includes a guide configured to be linearly movable together with the filter holder to transmit a force in the direction into which the filter is inserted, a pusher including an elastic member, and the pusher, and configured to transmit a force in the direction opposite to the direction, into which the filter is inserted, by an elastic member, a stopper rotatably received in the pusher to be arranged between the pusher and the guide, and configured to lock the filter to the filter holder or release the filter from the filter holder by being linearly moved by the guide and the pusher, and a cam configured to guide rotation and linear movement of the stopper.

The lock may further include a housing to which the cam is coupled and in which the pusher is received to be linearly movable.

The housing may include an inlet tube through which water is introduced to the filter when the filter is inserted into the filter holder, and an outlet tube through which the introduced water is filtered by the filter and discharged from the filter when the filter is inserted into the filter holder, and the filter may include an inlet connected to the inlet tube, and an outlet connected to the outlet tube, and the filter holder may include a first connection tube configured to connect the inlet tube to the inlet, and a second connection tube configured to connect the outlet tube to the outlet.

The cam may include a plurality of guide grooves formed on an inner circumferential surface of the cam to guide linear movement of the stopper, and a plurality of rotation guides formed among the plurality of guide grooves to guide rotation of the stopper.

The filter may include a fixing groove formed to have a groove shape along an outer circumferential surface of thereof to be inserted and fixed into the filter holder, and the filter holder may include a fixing protrusion fixed to the fixing groove to allow the filter to be attachable to or detachable from the filter holder.

BRIEF DESCRIPTION OF THE DRAWINGS

These and/or other aspects of the disclosure will become apparent and more readily appreciated from the following description of embodiments, taken in conjunction with the accompanying drawings of which:

FIG. 19 is a view illustrating a state in which a configuration of the stopper and the pusher of FIG. 18 are omitted.

DETAILED DESCRIPTION

Figure 1:
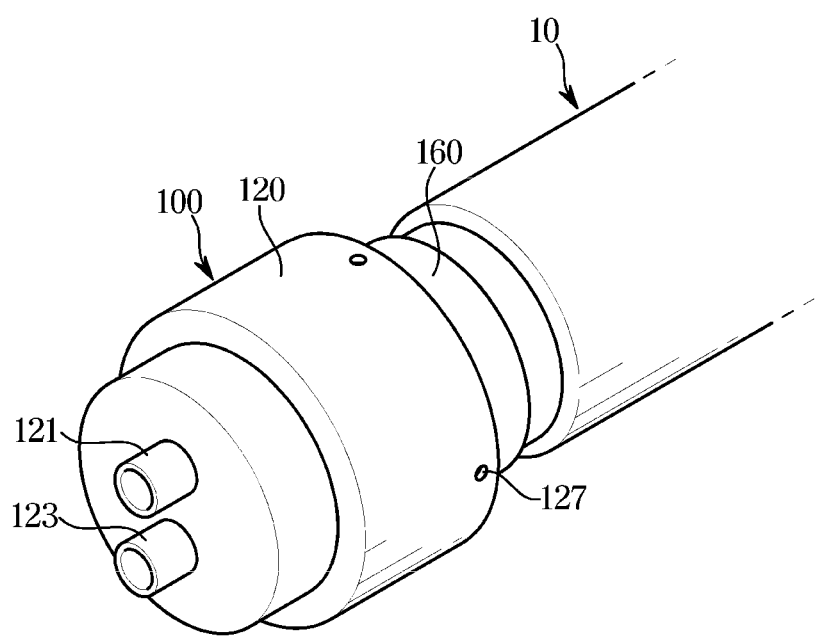
FIG. 1 is a perspective view illustrating a state in which a filter is locked to a filter holder according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front end", "rear end", "upper portion", "lower portion", "upper end", "lower end" and the like may be defined by the drawings, but the shape and the location of the component is not limited by the term.

Figure 2:
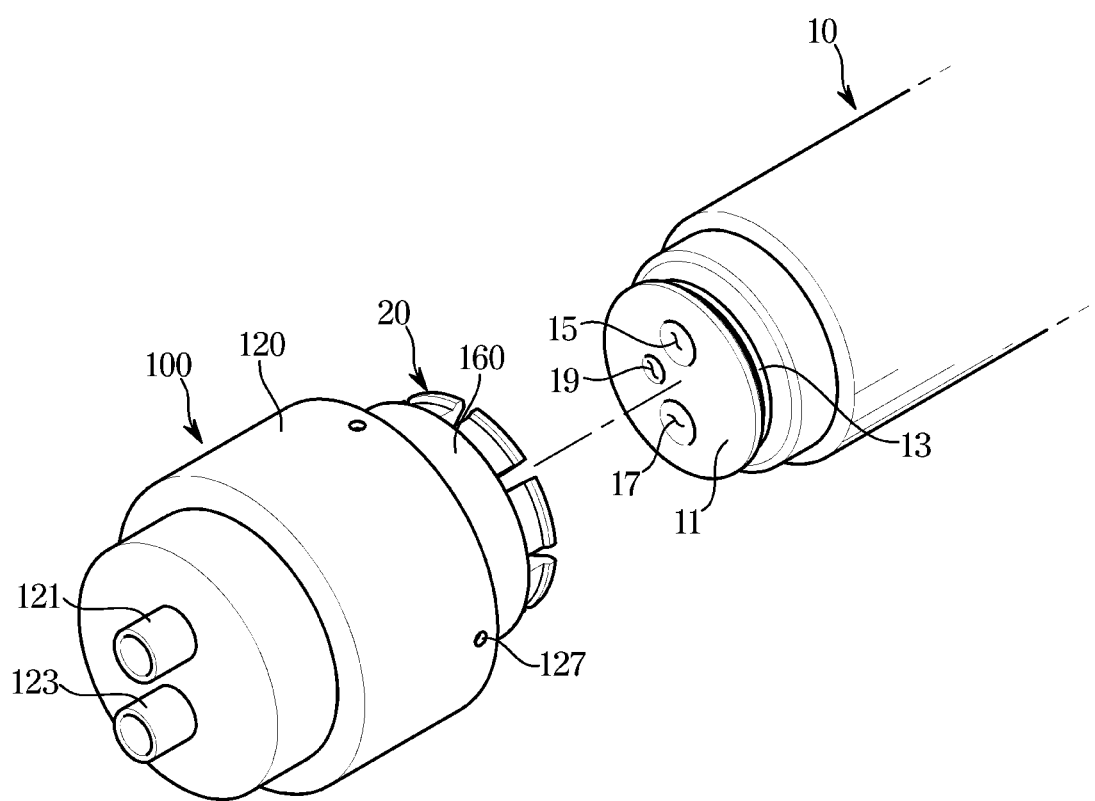
FIG. 2 is a perspective view illustrating a state in which the filter is separated from the filter holder by being released from the filter holder according to an embodiment of the disclosure.

The disclosure will be described more fully hereinafter with reference to the accompanying drawings FIG. 1 is a perspective view illustrating a state in which a filter is locked to a filter holder according to an embodiment of the disclosure and FIG. 2 is a perspective view illustrating a state in which the filter is separated from the filter holder by being released from the filter holder according to an embodiment of the disclosure.

As illustrated in FIGS. 1 and 2, a filter assembly may include a filter 10, a filter holder 20 to which the filter 10 is attachable to or detachable from the filter holder 20, and a locking device 100 configured to lock and release the filter 10 to and from the filter holder 20.

The filter 10 may include an insert 11 inserted into the filter holder 20, an inlet 15 through which raw water is introduced, an outlet 17 through which the introduced raw water is filtered by the filter 10 and then discharged, and a positioning hole 19 configured to select a position in which the filter 10 is coupled to the filter holder 20.

The insert 11 may include a fixing groove 13 formed to have a groove shape along an outer circumferential surface of the insert 11 so that the insert 11 is inserted and fixed into the filter holder 20. As will be described later, the filter holder 20 may include a fixing protrusion 22 fixed to the fixing groove 13 to allow the filter 10 to be attachable to or detachable from the filter holder 20 (refer to FIG. 4).

A positioning protrusion 26 of the filter holder 20 to be described later may be inserted into the positioning hole 19.

The positioning hole 19 may select a position, in which the filter 10 is coupled to the filter holder 20, so that the inlet 15 and the outlet 17 are respectively connected to an inlet tube 121 and an outlet tube 123 when the filter 10 is fixed to the filter holder 20. The inlet 15 of the filter 10 may be connected to a first connection tube 23 of the filter holder 20 to insert the positioning protrusion 26 of the filter holder 20 into the positioning hole 19 of the filter 10. In addition, the outlet 17 of the filter 10 may be connected to a second connection tube 24 of the filter holder 20. Therefore, the inlet 15 of the filter 10 may be connected to the inlet tube 121 of the housing 120 through the first connection tube 23. In addition, the outlet 17 of the filter 10 may be connected to the outlet tube 123 of the housing 120 through the second connection tube 24 (refer to FIG. 4).

Figure 3:
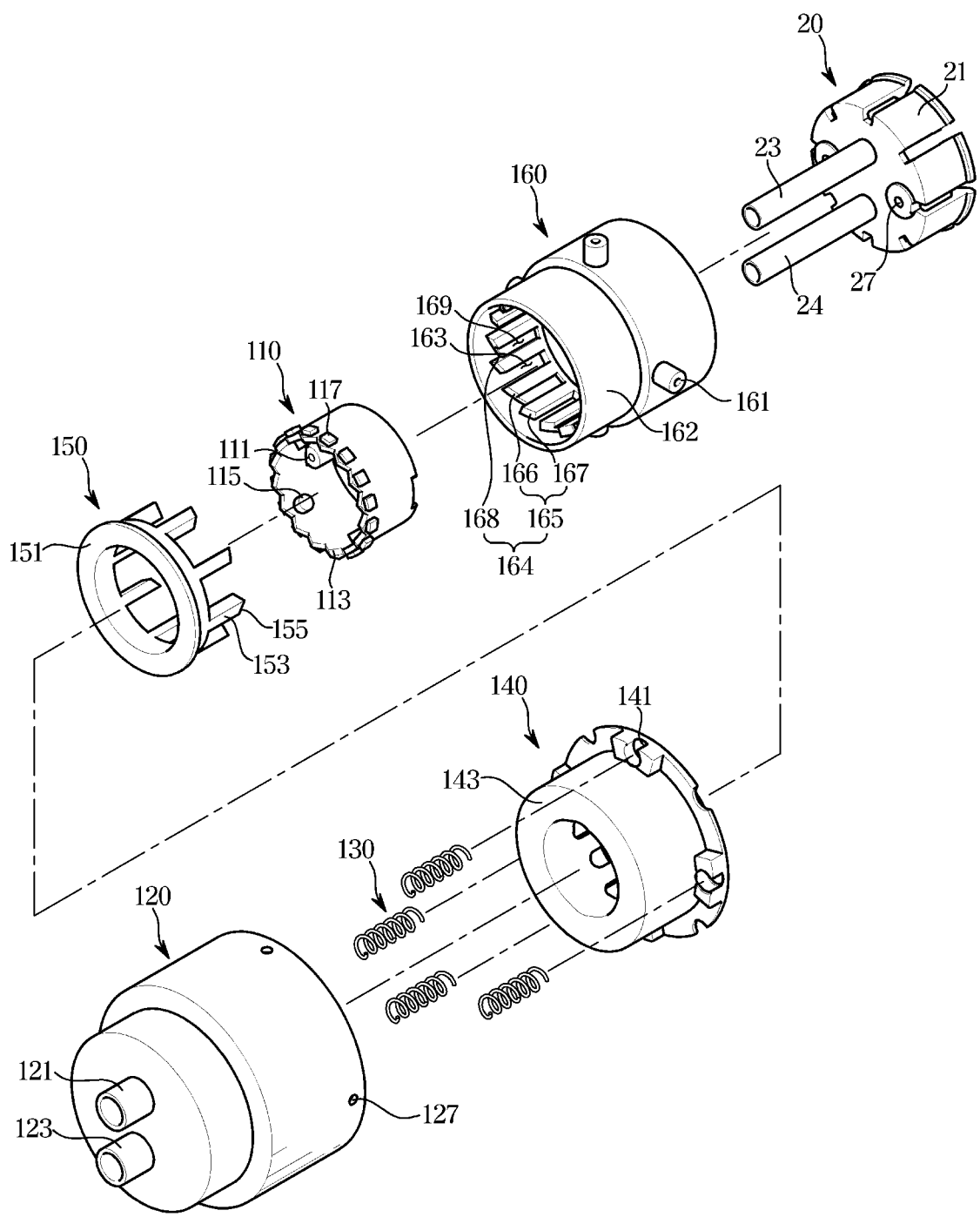
FIG. 3 is an exploded perspective view of the filter holder and a locking device coupled to the filter holder according to an embodiment of the disclosure.
Figure 4:
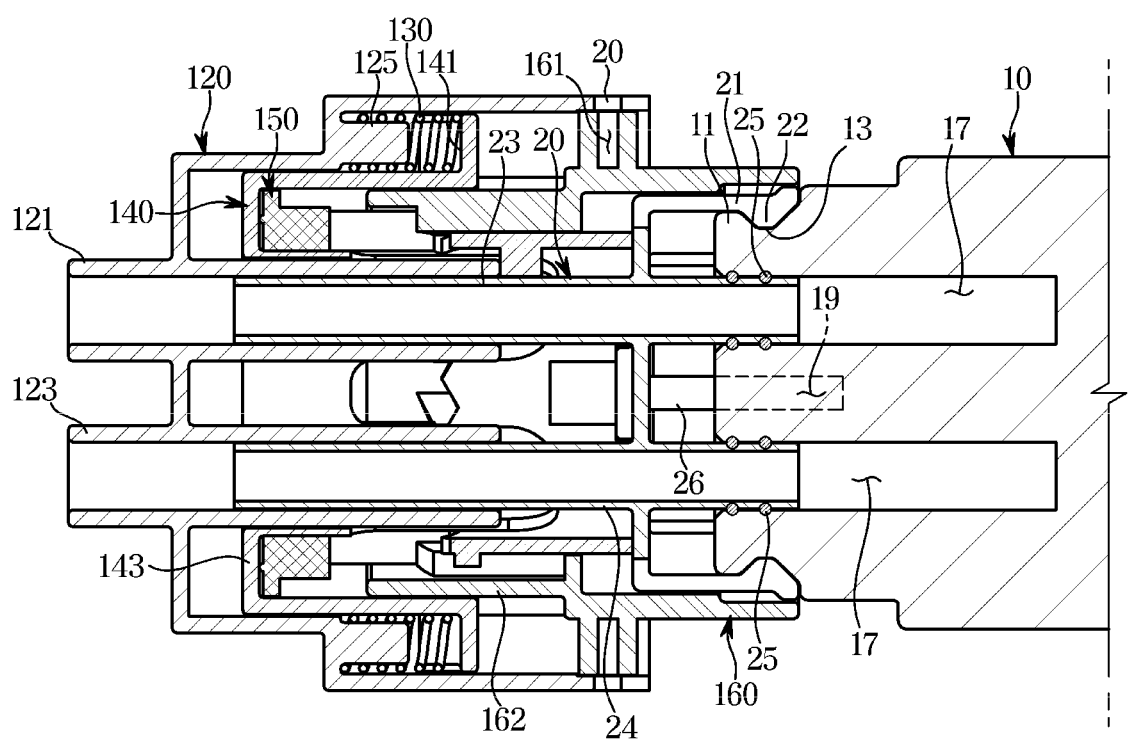
FIG. 4 is a cross-sectional view illustrating a state in which the filter is locked to the filter holder according to an embodiment of the disclosure.
Figure 5:
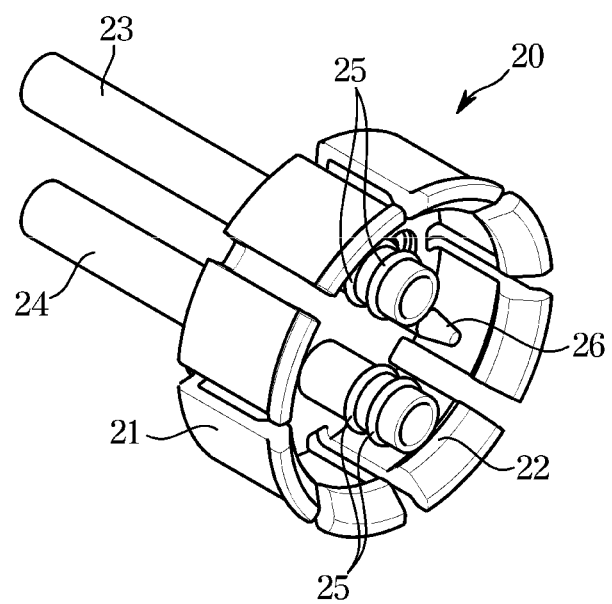
FIG. 5 is a view illustrating a state in which the filter holder is coupled to a guide according to an embodiment of the disclosure.
Figure 6:
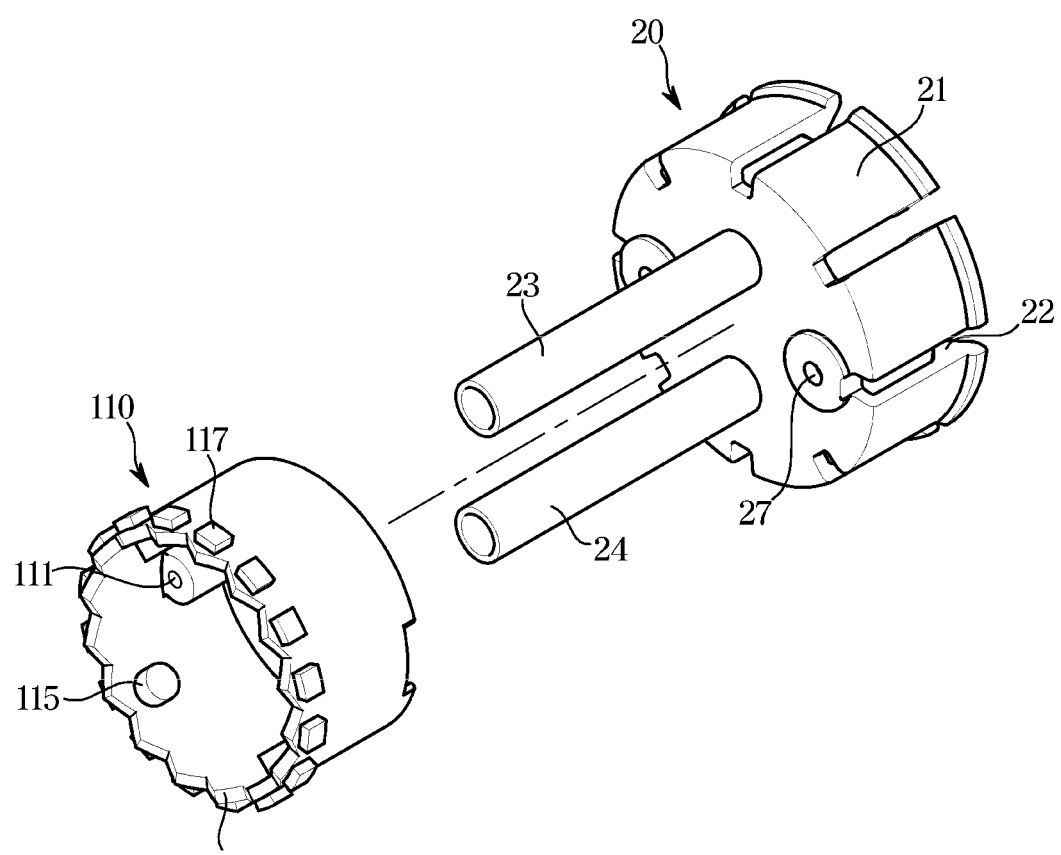
FIG. 6 is a view illustrating the filter holder of FIG. 5 at a different angle.
Figure 7:
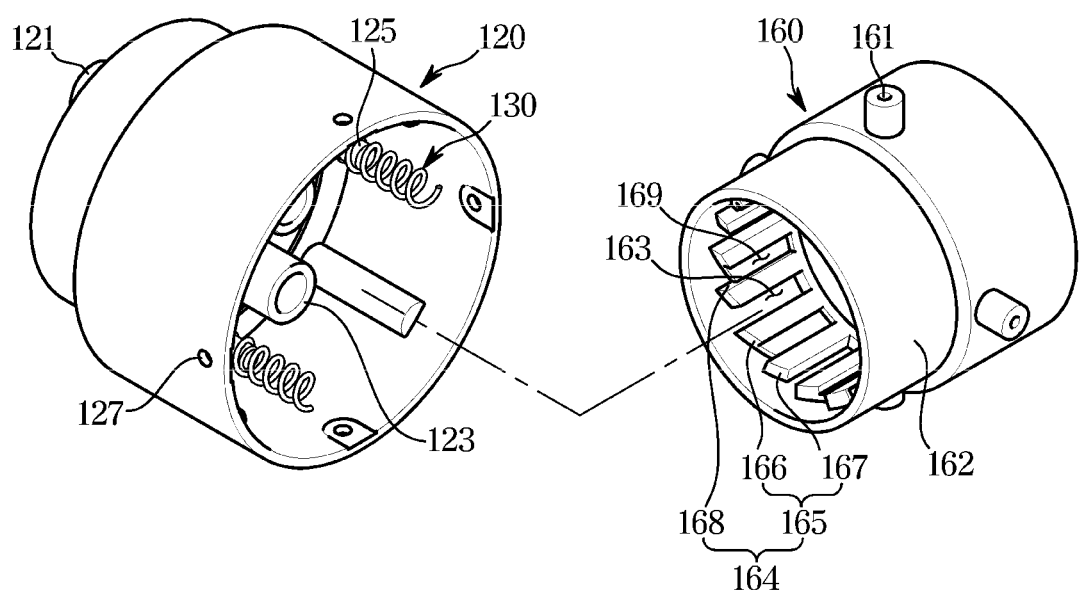
FIG. 7 is a view illustrating a state in which a housing and a cam is coupled to each other according to an embodiment of the disclosure.
Figure 8:
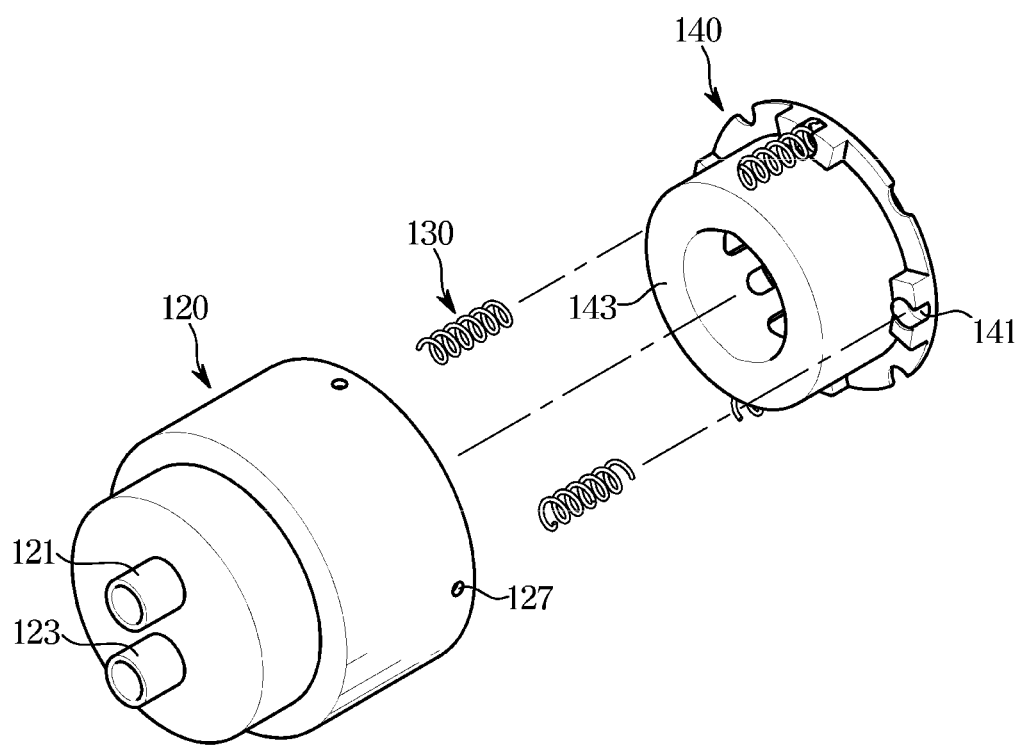
FIG. 8 is a view illustrating a state in which a pusher is received in the housing according to an embodiment of the disclosure.
Figure 9:
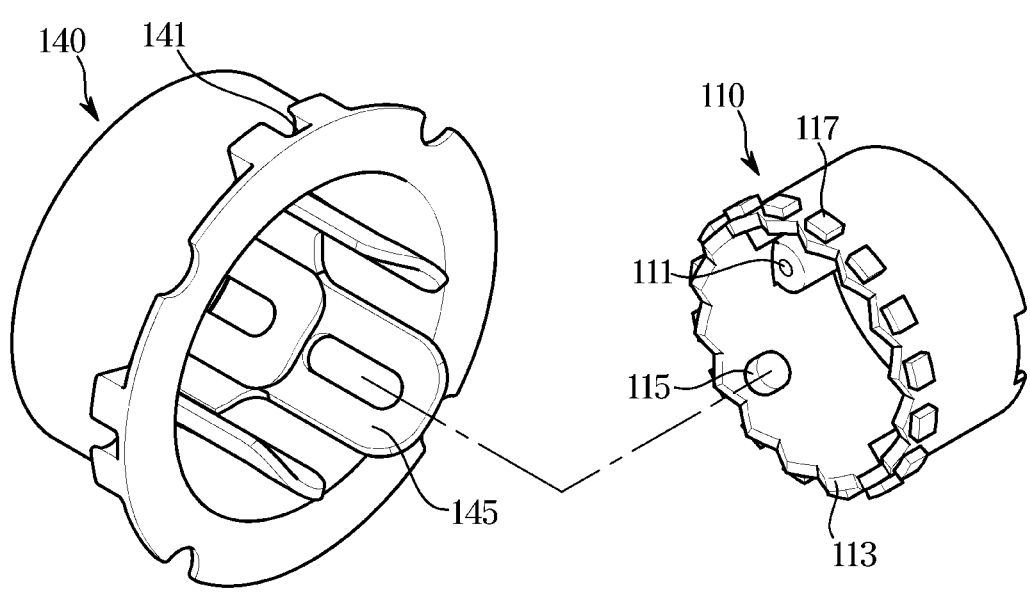
FIG. 9 is a view illustrating a state in which a first guide protrusion of the guide is guided by a guide portion of the pusher according to an embodiment of the disclosure.

FIG. 3 is an exploded perspective view of the filter holder and a locking device coupled to the filter holder according to an embodiment of the disclosure, FIG. 4 is a cross-sectional view illustrating a state in which the filter is locked to the filter holder according to an embodiment of the disclosure, FIG. 5 is a view illustrating a state in which the filter holder is coupled to a guide according to an embodiment of the disclosure, FIG. 6 is a view illustrating the filter holder of FIG. 5 at a different angle, FIG. 7 is a view illustrating a state in which a housing and a cam is coupled to each other according to an embodiment of the disclosure, FIG. 8 is a view illustrating a state in which a pusher is received in the housing according to an embodiment of the disclosure and FIG. 9 is a view illustrating a state in which a first guide protrusion of the guide is guided by a guide portion of the pusher according to an embodiment of the disclosure.

As illustrated in FIGS. 3 to 9, the locking device 100 configured to lock and release the filter 10 to and from the filter holder 20 may be mounted to the filter holder 20.

The filter holder 20 may include a fixing portion 21 into which the insert 11 of the filter 10 is inserted and attachable to or detachable from the filter holder, the first connection tube 23 configured to connect the inlet tube 121 of the housing 120 to the inlet 15 of the filter 10, the second connection tube 24 configured to connect the outlet tube 123 of the housing 120 to the outlet 17 of the filter 10, an O-ring 25 provided on an outer circumferential surface of the first connection tube 23 inserted into the inlet 15, so as to seal between the inlet 15 and the first connection tube 23, and provided on an outer circumferential surface of the second connection tube 25 inserted into the outlet 17, so as to seal between the outlet 17 and the second connection tube 25, the positioning protrusion 26 inserted into the positioning hole 19, and a plurality of guide coupling holes 27 coupled to a guide 110.

The fixing portion 21 may include a fixing protrusion 22 fixed to the fixing groove 13 of the filter 10 that is inserted and fixed into the filter holder 20. The fixing portion 21 may be elastically deformable. Therefore, when the fixing portion 21 is received in the inside of a cam 160, the filter 10 may be locked to the fixing portion 21, and when the fixing portion 21 is exposed to the outside of the cam 160, the filter 10 may be released from the fixing portion 21. The O-ring 25 may be provided in plural.

The locking device 100 may include the guide 110 coupled to the filter holder 20, the housing 120 including the inlet tube 121 and the outlet tube 123, and a plurality of elastic members 130 having one side thereof supported by the housing 120, a pusher 140 on which the other side of the plurality of elastic members 130 is supported, a stopper 150 arranged between the pusher 140 and the guide 110 so as to be rotatably received in the inside of the pusher 140, and the cam 160 configured to guide rotation and linear movement of the stopper 150.

The guide 110 may be coupled to the filter holder 20 and then moved linearly with the filter holder 20. The guide 110 may be replaced in the inside of the cam 160 and linearly moved. When the filter 10 is inserted into the filter holder 20, the guide 110 may be linearly moved in a direction, into which the filter 10 is inserted, together with the filter holder 20 and thus the guide 110 may transmit a force in the direction into which the filter 10 is inserted.

The guide 110 may include a plurality of filter holder coupling holes 111 coupled to the filter holder 20, a contact portion 113 in contact with the stopper 150 to linearly move the stopper 150, a plurality of first guide protrusions 115 formed on an inner circumferential surface of the guide 110 to guide the linear movement of the guide 110, and a plurality of second guide protrusions 117 formed on an outer circumferential surface of the guide 110 to guide the linear movement of the guide 110.

The contact portion 113 may be formed by a plurality of uneven portions having an inclined surface. In the drawings, the contact portion 113 may have a triangular shape, but the shape of the contact portion 113 is not limited thereto. The inclined surface of the contact portion 113 may be in contact with an inclined portion 155 of the stopper 150. In a state in which the inclined surface of the contact portion 113 is in contact with the inclined portion 155 of the stopper 150, the filter 10 may be inserted into the filter holder 20 and the filter holder 20 may be pushed in the direction into which the filter 10 is inserted. In this case, the guide 110 may be linearly moved in the direction, into which the filter 10 is inserted, together with the filter holder 20. The guide 110, which is linearly moved in the direction into which the filter 10 is inserted, may transmit a force in the direction, into which the filter 10 is inserted, to the stopper 150. When the force in the direction, into which the filter 10 is inserted, is transmitted to the stopper 150, the stopper 150 may also be linearly moved in the direction into which the filter 10 is inserted.

The plurality of first guide protrusions 115 formed on the inner circumferential surface of the guide 110 may be guided by a guide portion 145 of the pusher 140 so as to linearly move the guide 110. The plurality of second guide protrusions 117 formed on the outer circumferential surface of the guide 110 may be guided by a guide groove 163 and a guide groove portion 169 of the cam 160 so as to linearly move the guide 110.

The housing 120 may include the inlet tube 121 through which raw water is introduced, the outlet tube 123 through which the introduced raw water is filtered by the filter 10 and then discharged, a plurality of support protrusions 125 on which one side of the plurality of elastic members 130 is supported, and a plurality of cam coupling holes 127 to which the cam 160 is coupled.

The inlet tube 121 may be connected to the inlet 15 of the filter 10 through the first connection tube 23 of the filter holder 20. The outlet tube 123 may be connected to the outlet 17 of the filter 10 through the second connection tube 24 of the filter holder 20. The raw water introduced into the inlet tube 121 may be introduced into the inlet 15 of the filter 10 through the first connection tube 23 and filtered, the purified water that is filtered may be delivered to the second connection tube 24 through the outlet 17, and then the purified water delivered to the second connection tube 24 may be discharged through the outlet tube 123.

The elastic member 130 may be provided in plural and one side thereof may be supported by the support protrusion 125 of the housing 120, and the other side thereof may be supported by a support groove 141 of the pusher 140. Because the housing 120, on which one side of the elastic member 130 is supported, is fixed, the pusher 140, on which the other side of the elastic member 130 is supported, may transmit the force in a direction opposite to the direction, into which the filter 10 is inserted, by the elastic force of the elastic member 130. The force that is transmitted to the direction opposite to the direction, into which the filter 10 is inserted may linearly move the stopper 150, which is in contact with the pusher 140, to the direction opposite to the direction into which the filter 10 is inserted.

The pusher 140 may include the plurality of support grooves 141 on which the other side of the plurality of elastic members 130 is supported, a pressing portion 143 in contact with the stopper 150 so as to linearly move the stopper 150 toward the direction opposite to the direction into which the filter 10 is inserted, and a plurality of guide portions 145 configured to guide the plurality of guide protrusions 115 so as to linearly move the guide 110.

The pusher 140 may be linearly moved in the direction opposite to the direction, into which the filter 10 is inserted, by the elastic force of the elastic member 130. The stopper 150 which is in contact with the pusher 140 may be pressed by the pusher 140 which is linearly moved in the direction opposite to the direction into which the filter 10 is inserted, and thus the stopper 150 may be linearly moved in the direction opposite to the direction into which the filter 10 is inserted.

The stopper 150 may be rotatably received in the inside of the pusher 140 to be arranged between the pusher 140 and the guide 110. The stopper 150 may include a pressed surface 151 pressed by the pressing portion 143 of the pusher 140, a plurality of guide bars 153 guided by the cam 160 to rotate and linearly move the stopper 150, and an inclined portion 155 formed at the end of the guide bar 155 so as to be in contact with the contact portion 113 of the guide 110.

The pressed surface 151 may be pressed by the pressing portion 143 of the pusher 140, which is moved linearly in the direction opposite to the direction into which the filter 10 is inserted, and thus the pressed surface 151 may be linearly moved in the direction opposite to the direction into which the filter 10 is inserted. The plurality of guide bars 153 may be linearly moved by being guided by the guide grooves 163 of the cam 160. In addition, the plurality of guide bars 153 may be guided and rotated by a rotation guide 164 of the cam 160. The inclined portion 155 formed at the end of the guide bar 153 may include an inclined surface having an angle corresponding to the inclined surface of the contact portion 113.

The stopper 150 may be rotatably moved in one direction by the rotation guide 164 of the cam 160. The stopper 150 arranged between the pusher 140 and the guide 110 may be linearly moved in the direction, into which the filter 10 is inserted, by the guide 110, and the stopper 150 may be linearly moved in the direction opposite to the direction, into which the filter 10 is inserted, by the pusher 140.

The cam 160 may guide rotation and linear movement of the stopper 150 so as to lock and release the filter 10 to and from the filter holder 20.

The cam 160 may include the plurality of housing coupling holes 161 coupled to the housing 120, a pusher guide 162 received in the inside of the pusher 140 to guide the pusher 140 to move linearly the pusher 140, the plurality of guide grooves 163 formed on the inner circumferential surface of the cam 160 to guide the linear movement of the plurality of guide bars 153, and the plurality of rotation guides 164 formed among the plurality of guide grooves 163 to guide the plurality of guide bars 153 so as to rotate the stopper 150.

Each of the plurality of rotation guides 164 may include a pair of rotating inclined surfaces 165 formed to have an inclined surface having an angle corresponding to the inclined surface formed on the contact portion 113 of the guide 110 and the inclined portion 155 of the stopper 150. The pair of rotating inclined surfaces 165 may guide the stopper 150 to allow the stopper 150 to be rotated toward one direction through the inclined surface. The pair of rotating inclined surfaces 165 may include a first rotating inclined surface 166 connected to the guide groove 163 in a direction in which the stopper 150 is rotated, and a second rotating inclined surface 167 spaced apart from the first rotating inclined surface 166 in the direction in which the stopper 150 is rotated Each of the plurality of rotation guides 164 may include a movement stopper 168 formed between the first rotating inclined surface 166 and the second rotating inclined surface 167. The movement stopper 168 may stop the rotation of the stopper 150 rotated along the first rotating inclined surface 166. In addition, the movement stopper 168 may prevent the linear movement of the stopper 150 toward the direction opposite to the direction into which the filter 10 is inserted. The movement stopper 168 may include the guide groove portion 169 configured to guide the linear movement of the plurality of second guide protrusions 117 formed in the guide 110, together with the plurality of guide grooves 163 (refer to FIG. 19).

Next, the operation of the locking device for locking and releasing the filter to and from the filter holder will be described with reference to FIGS. 10 to 19.

Figure 10:
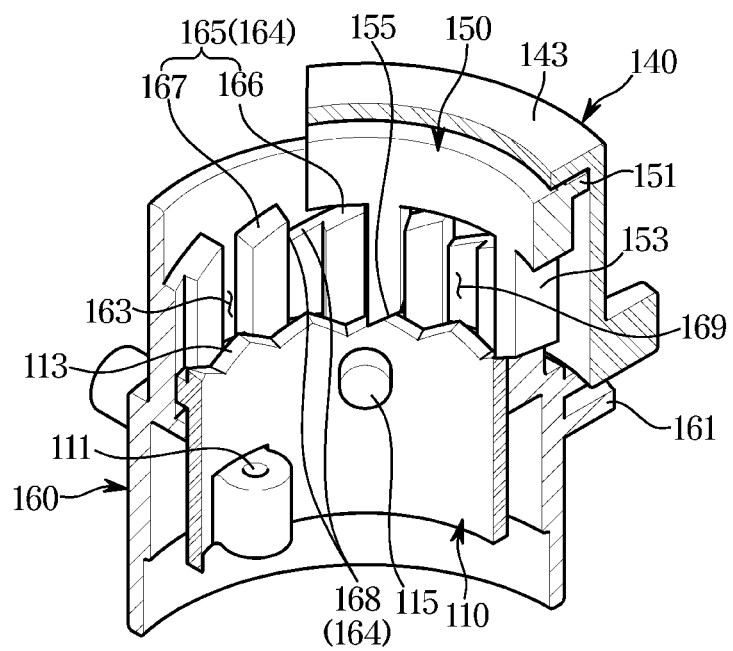
FIG. 10 is a view illustrating of the locking device in a state in which the filter is released from the filter holder according to an embodiment of the disclosure.
Figure 11:
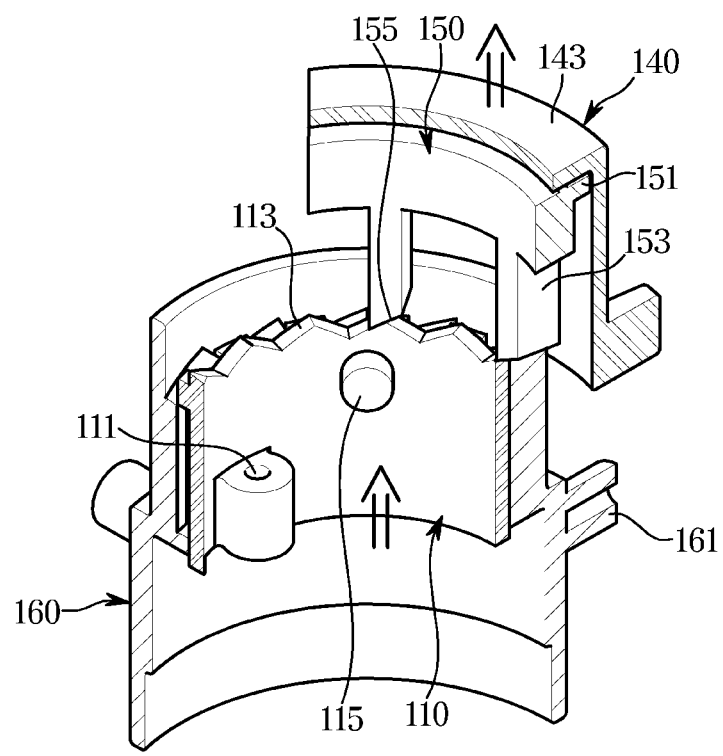
FIG. 11 is a view illustrating a state in which the filter inserted to the filter holder is pressed to move the guide to a direction, into which the filter is inserted, so as to lock the filter to the filter holder based on FIG. 10.
Figure 12:
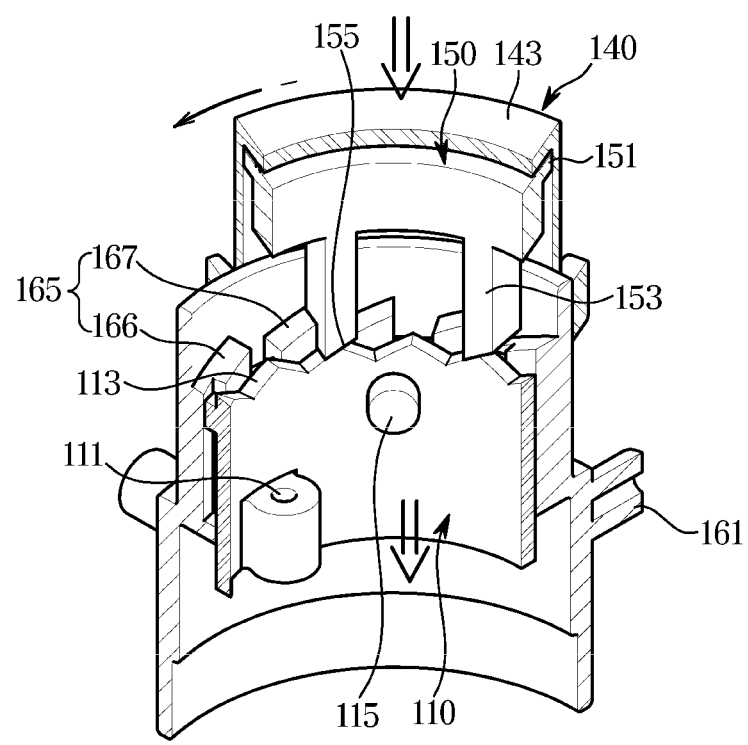
FIG. 12 is a view illustrating a state in which a stopper is rotated to prevent a liner movement in a direction opposite to the direction, into which the filter is inserted, and thus the filter is locked to the filter holder based on FIG. 11.
Figure 13:
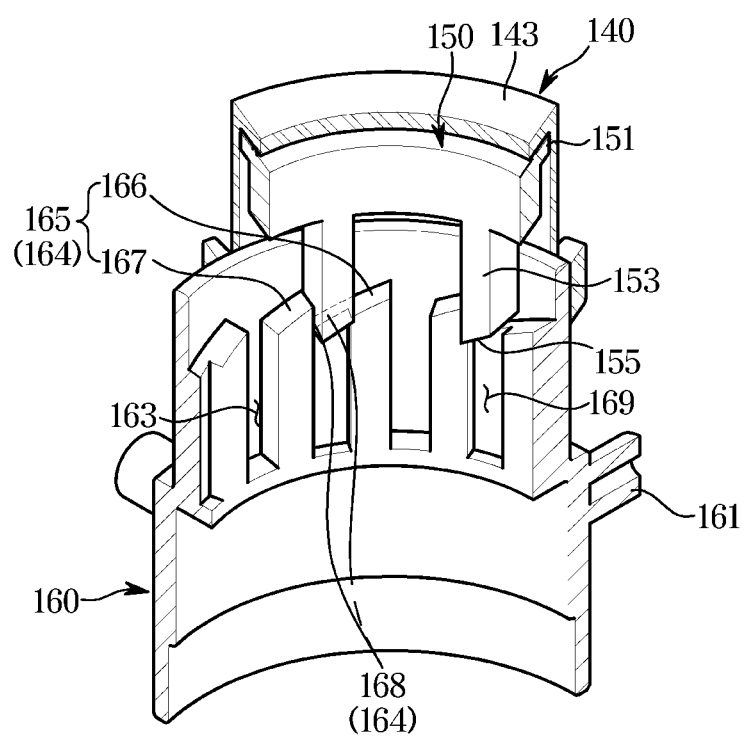
FIG. 13 is a view illustrating a state in which a configuration of the guide of FIG. 12 is omitted.
Figure 14:
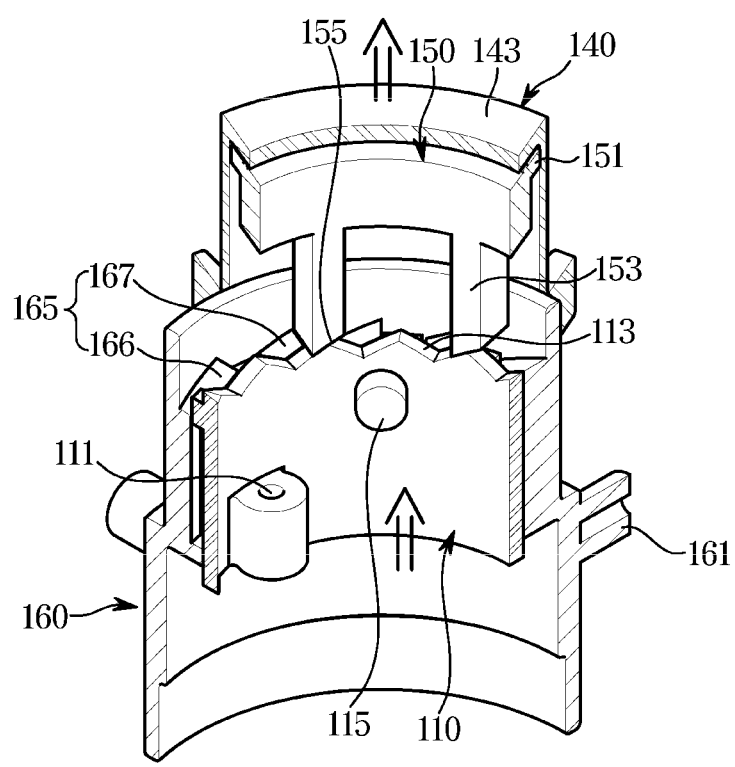
FIG. 14 a view illustrating a state in which the filter is pressed to move the guide toward the direction, into which the filter is inserted, so as to release the filter from the filter holder based on FIG. 12.
Figure 15:
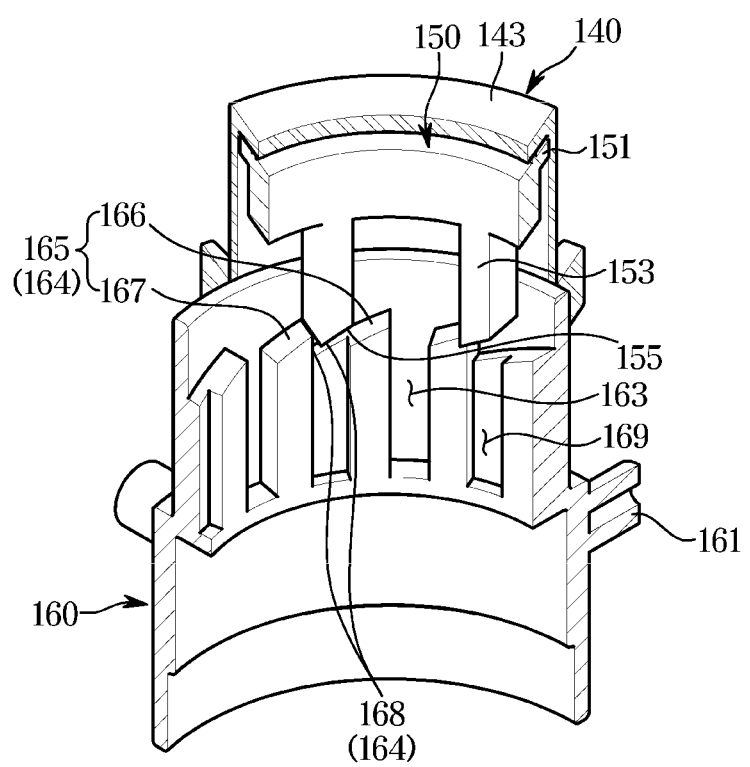
FIG. 15 is a view illustrating a state in which the configuration of the guide of FIG. 14 is omitted.
Figure 16:
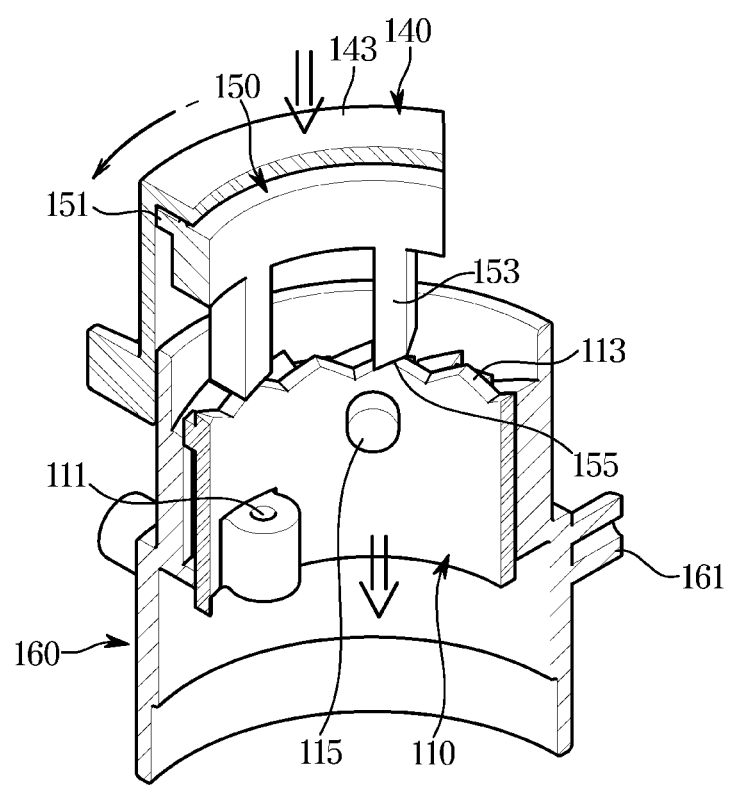
FIG. 16 is a view illustrating a state in which the stopper is rotated along an inclined surface based on FIG. 15.
Figure 17:
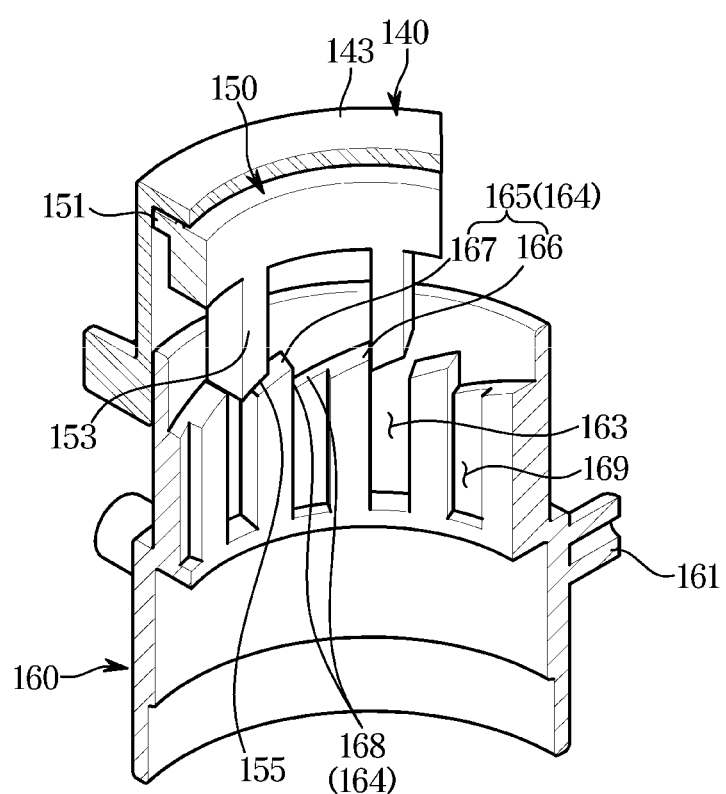
FIG. 17 is a view illustrating a state in which the configuration of the guide of FIG. 16 is omitted.
Figure 18:
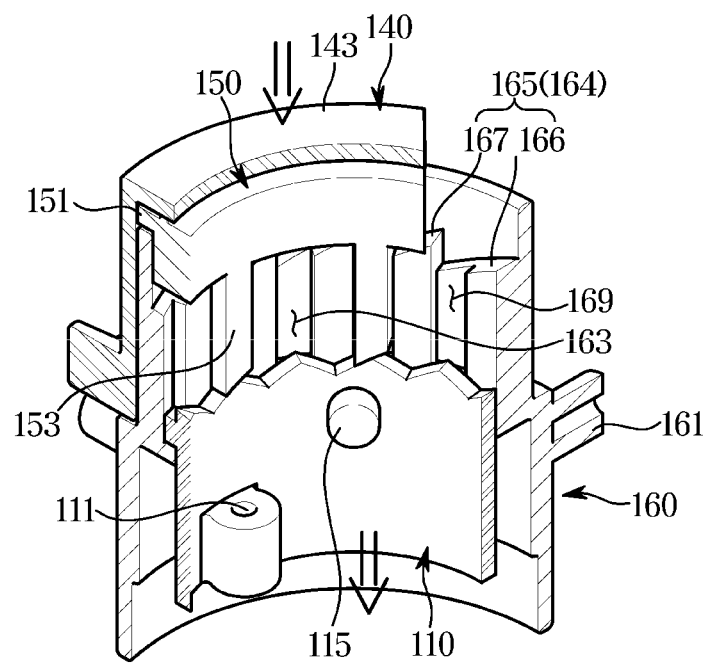
FIG. 18 is a view illustrating a state in which the stopper is pressed by the pusher to be linearly moved in the direction opposite to the direction, into which the filter is inserted, and thus a guide bar is inserted into a guide groove based on FIG. 16.
Figure 6:
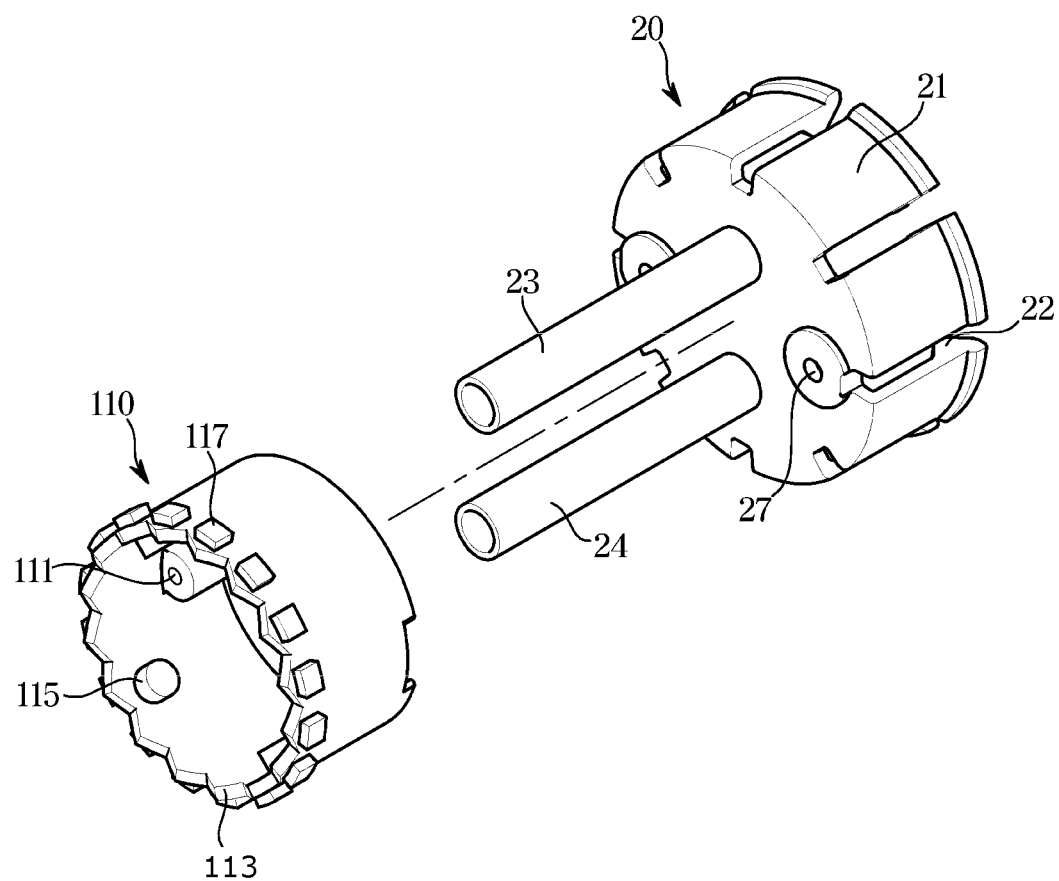

FIG. 10 is a view illustrating of the locking device in a state in which the filter is released from the filter holder according to an embodiment of the disclosure, FIG. 11 is a view illustrating a state in which the filter inserted to the filter holder is pressed to move the guide to a direction, into which the filter is inserted, so as to lock the filter to the filter holder based on FIG. 10, FIG. 12 is a view illustrating a state in which a stopper is rotated to prevent liner movement in a direction opposite to the direction, into which the filter is inserted, and thus the filter is locked to the filter holder based on FIG. 11, FIG. 13 is a view illustrating a state in which a configuration of the guide of FIG. 12 is omitted, FIG. 14 a view illustrating a state in which the filter is pressed to move the guide toward the direction, into which the filter is inserted, so as to release the filter from the filter holder based on FIG. 12, FIG. 15 is a view illustrating a state in which the configuration of the guide of FIG. 14 is omitted, FIG. 16 is a view illustrating a state in which the stopper is rotated along an inclined surface based on FIG. 15, FIG. 17 is a view illustrating a state in which the configuration of the guide of FIG. 16 is omitted, FIG. 18 is a view illustrating a state in which the stopper is pressed by the pusher to be linearly moved in the direction opposite to the direction, into which the filter is inserted, and thus a guide bar is inserted into a guide groove based on FIG. 16, and FIG. 19 is a view illustrating a state in which a configuration of the stopper and the pusher of FIG. 18 are omitted.

In FIGS. 10 to 19, an upward direction indicates a direction in which the filter 10 is inserted into the filter holder 20. For convenience, the direction in which the filter 10 is inserted into the filter holder 20 is illustrated as the upward direction, and a direction opposite to the direction in which the filter 10 is inserted into the filter holder 20 is illustrated as a downward direction.

As illustrated in FIG. 10, before the filter 10 is locked to the filter holder 20 in a state in which the filter 10 is inserted into the filter holder 20, the plurality of guide bars 153 may be inserted to the plurality of guide grooves163 (refer to FIG. 4).

As illustrated in FIG. 11, when the filter 10 is pushed in the direction, into which the filter 10 is inserted, to be locked to the filter holder 20, the filter holder 20 may be linearly moved in the direction into which the filter 10 is inserted. When the filter holder 20 is linearly moved in the direction into which the filter 10 is inserted, the guide 110 coupled to the filter holder 20 may also be linearly moved in the direction into which the filter 10 is inserted. When the guide 110 is linearly moved in the direction into which the filter 10 is inserted, the stopper 150 and the pusher 140 may also be linearly moved in the direction, into which the filter 10 is inserted, by the guide 110. When the stopper 150 and the pusher 140 are linearly moved in the direction into which the filter 10 is inserted, the guide bar 153 of the stopper 150 may be separated from the guide groove 163 of the cam 160. In this case, the fixing portion 21 of the filter holder 20 may be in a state of being received in the cam 160 (refer to FIG. 4).

When the guide bar 153 of the stopper 150 is separated from the guide groove 163 of the cam 160, the guide bar 153 may be rotated along the first rotating inclined surface 166 of the cam 160 and the inclined surface formed on the contact portion 113 of the guide 110 in a state in which the inclined portion 155 of the stopper 150 is in contact with the first rotating inclined surface 166 of the cam 160 and the inclined surface formed on the contact portion 113 of the guide 110, as illustrated in FIGS. 12 and 13. In this case, the stopper 150 and the pusher 140 may be rotated and at the same time linearly moved partially in the downward direction. The guide 110 may also be moved downward by the stopper 150 moved downward. During the stopper 150 and the pusher 140 are rotated and at the same time linearly moved partially in the downward direction, the guide bar 153 may be caught by the movement stopper 168 of the cam 160, thereby preventing rotation and linear movement thereof. Therefore, the fixing portion 21 of the filter holder 20 may be maintained in a state of being received in the inside of the cam 160 and thus the filer 10 may be locked to the filter holder 20 (refer to FIG. 4).

When the filter 10 is pushed to be released from the filter holder 20 as illustrated in FIGS. 14 and 15, the guide 110 may be linearly moved in the upward direction. When the guide 110 is moved upward, the stopper 150 and the pusher 140 may also be linearly moved upward by the guide 110. When the stopper 150 is linearly moved upward, the guide bar 153 of the stopper 150 may be separated from the movement stopper 168 (refer to FIG. 4).

When the guide bar 153 of the stopper 150 is separated from the movement stopper 168, the guide bar 153 may be rotated along the second rotating inclined surface 167 of the cam 160 and the inclined surface formed on the contact portion 113 of the guide 110 in a state in which the inclined portion 155 of the stopper 150 is in contact with the first rotating inclined surface 166 of the cam 160 and the inclined surface formed on the contact portion 113 of the guide 110, as illustrated in FIGS. 17 and 18. In this case, the stopper 150 and the pusher 140 may be rotated and at the same time linearly moved partially in the downward direction. The guide 110 may also be moved downward by the stopper 150 moved downward. The guide bar 153 of the stopper 150 may be moved to a position of being inserted into the guide groove 163.

When the stopper 150 and the pusher 140 are rotated and at the same time linearly moved partially in the downward direction and thus the guide bar 153 of the stopper 150 is moved to a position of being inserted into the guide groove 163, the stopper 150 may be linearly moved downward by the pusher 140 pressed by the elastic member 130, as illustrated in FIGS. 18 and 19. When the stopper 150 is linearly moved downward, the guide bar 153 may be inserted into the guide groove 163. When the guide bar 153 is inserted into the guide groove 163 and the stopper 150 is linearly moved downward, the fixing portion 21 of the filter holder 20 may be exposed to the outside of the cam 160. When the fixing portion 21 of the filter holder 20 is exposed to the outside of the cam 160, the filter 10 may be released from the filter holder 20. When the filter 10 is released from the filter holder 20, the filter 10 may be separated from the filter holder 20 (refer to FIG. 4).

As described above, the filter 10 may be locked to and released from the filter holder 20 by only an operation of pressing the filter 10, and thus the filter 10 may be easily assembled and disassembled.

As is apparent from the above description, the assembly and disassembly of the filter may be easy, and thus the production speed and the working speed for the replacement of the filter may be improved.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A filter assembly for a water purifier comprising:
a filter holder into which a part of a filter is insertable; and
a lock mounted to the filter holder and configured to lock the filter to or release the filter from the filter holder, wherein the lock comprises:
a guide coupled to the filter holder and configured to be linearly movable to transmit a force in a direction into which the filter is inserted;
a pusher including an elastic member, and the pusher configured to transmit a force in a direction opposite to the direction, into which the filter is inserted, by the elastic member;
a stopper rotatably received in the pusher to be arranged between the pusher and the guide; and configured to linearly move the filter holder by being linearly moved by the guide and the pusher; and
a cam configured to lock the filter to the filter holder or release the filter from the filter holder by guiding rotation and linear movement of the stopper, the cam comprising:
a plurality of guide grooves formed on an inner circumferential surface of the cam to guide linear movement of the stopper; and
a plurality of rotation guides formed among each of the plurality of guide grooves to guide the stopper to be rotated.

2. The filter assembly for the water purifier of claim 1, wherein
the lock further comprises a housing in which the pusher is received to be linearly movable.

3. The filter assembly for the water purifier of claim 2, wherein the housing comprises an inlet tube through which water is introduced to the filter when the filter is inserted into the filter holder, an outlet tube through which the introduced water is filtered by the filter and discharged from the filter when the filter is inserted into the filter holder, a plurality of support protrusions on which one side of the elastic member is supported, and a plurality of cam holes to which the cam is coupled.

4. The filter assembly for the water purifier of claim 3, wherein
the filter comprises an insert inserted into the filter holder, an inlet connected to the inlet tube, an outlet connected to the outlet tube, and a positioning hole configured to select a position, in which the filter is coupled to the filter holder, so as to connect the inlet to the inlet tube and to connect the outlet to the outlet tube.

5. The filter assembly for the water purifier of claim 4, wherein
the filter holder comprises:
a fixing protrusion extended from the a bottom portion of the filter holder and to which the insert of the filter extended from the a bottom portion of the filter holder and to is insertable so that the filter is attachable to or detachable from the filter holder;
a first connection tube configured to connect the inlet tube to the inlet,
a second connection tube configured to connect the outlet tube to the outlet;
an O-ring respectively provided on an outer circumferential surface of the first connection tube inserted into the inlet, so as to seal between the inlet and the first connection tube and on an outer circumferential surface of the second connection tube inserted into the outlet, so as to seal between the outlet and the second connection tube;
a positioning protrusion inserted into the positioning hole; and
a plurality of guide coupling holes coupled to the guide.

6. The filter assembly for the water purifier of claim 5, wherein
the fixing protrusion is elastically deformable and when the fixing protrusion is received in an inside of the cam, the filter is locked to the fixing protrusion, and when the fixing protrusion is exposed to an outside of the cam, the filter is released from the fixing protrusion.

7. The filter assembly for the water purifier of claim 6, wherein
the guide comprises a plurality of filter holder coupling holes coupled to the filter holder, a contact part in contact with the stopper to linearly move the stopper, a plurality of first guide protrusions formed on an inner circumferential surface of the guide to guide the linear movement of the guide, and a plurality of second guide protrusions formed on an outer circumferential surface of the guide to guide the linear movement of the guide.

8. The filter assembly for the water purifier of claim 7, wherein
the contact part is formed by a plurality of uneven parts comprising an inclined surface.

9. The filter assembly for the water purifier of claim 8, wherein
the pusher comprises a plurality of support grooves on which an other side of the elastic member is supported, so that the pusher is in contact with the stopper to press the stopper to allow the stopper to be linearly moved in the direction opposite to the direction into which the filter is inserted and a plurality of guide parts configured to guide linear movement of the plurality of first guide protrusions.

10. The filter assembly for the water purifier of claim 9, wherein the stopper comprises a pressed surface pressed by the push, a plurality of guide bars configured to rotate and linearly move the stopper by being guided by the cam, and an inclined part formed at an end of the guide bar so as to be in contact with the contact part and provided with an inclined surface having an angle corresponding to the inclined surface of the contact part.

11. The filter assembly for the water purifier of claim 10, wherein
the cam further comprises a plurality of housing coupling holes coupled to the plurality of cam holes, a pusher guide received in inside of the pusher to guide the pusher so as to allow the pusher to linearly moved, and
the plurality of guide grooves guides linear movement of the plurality of guide bars, and the plurality of rotation guides guides the plurality of guide bars to allow the stopper to be rotated.

12. The filter assembly for the water purifier of claim 11, wherein
each of the plurality of rotation guides comprises a plurality of rotating inclined surfaces provided with an inclined surface having an angle corresponding to the inclined surface formed on the contact part and the inclined part, the plurality of rotating inclined surfaces configured to guide the stopper to allow the stopper to be rotated toward one direction.

13. The filter assembly for the water purifier of claim 12, wherein
the plurality of rotating inclined surfaces comprises a first rotating inclined surface connected to the guide groove in a direction in which the stopper is rotated, and a second rotating inclined surface spaced apart from the first rotating inclined surface in the direction in which the stopper is rotated.

14. The filter assembly for the water purifier of claim 13, wherein
each of the plurality of rotation guides comprises a movement stopper formed between the first rotating inclined surface and the second rotating inclined surface so as to stop the rotation of the stopper rotated along the first rotating inclined surface and so as to prevent the linear movement of the stopper toward the direction opposite to the direction into which the filter is inserted.

15. The filter assembly for the water purifier of claim 14, wherein
the movement stopper comprises a guide groove part configured to guide the linear movement of the plurality of second guide protrusions, together with the plurality of guide grooves.

16. A filter assembly for a water purifier comprising:
a filter holder into which a part of a filter is insertable; and
a lock mounted to the filter holder, and configured to lock the filter to the filter holder based on movement of the filter holder in a direction into which the filter is inserted and configured to release the filter from the filter holder based on movement of the filter holder in a direction opposite to the direction into which the filter is inserted,
wherein the lock comprises:
a guide configured to be linearly movable together with the filter holder to transmit a force in the direction into which the filter is inserted;
a pusher including an elastic member, and the pusher, and configured to transmit a force in the direction opposite to the direction, into which the filter is inserted; by the elastic member;
a stopper rotatably received in the pusher to be arranged between the pusher and the guide, and configured to lock the filter to the filter holder or release the filter from the filter holder by being linearly moved by the guide and the pusher; and
a cam configured to guide rotation and linear movement of the stopper, the cam comprising:
a plurality of guide grooves formed on an inner circumferential surface of the cam to guide linear movement of the stopper; and
a plurality of rotation guides formed among the plurality of guide grooves to guide rotation of the stopper.

17. The filter assembly for the water purifier of claim 16, wherein
the lock further comprises a housing to which the cam is coupled and in which the pusher is received to be linearly movable.

18. The filter assembly for the water purifier of claim 17, wherein
the housing comprises an inlet tube through which water is introduced to the filter when the filter is inserted into the filter holder, and an outlet tube through which the introduced water is filtered by the filter and discharged from the filter to the filter when the filter is inserted into the filter holder, and the filter comprises an inlet connected to the inlet tube, and an outlet connected to the outlet tube, and the filter holder comprises a first connection tube configured to connect the inlet tube to the inlet, and a second connection tube configured to connect the outlet tube to the outlet.

19. The filter assembly for the water purifier of claim 16, wherein
the filter comprises a fixing groove formed to have a groove shape along an outer circumferential surface of thereof to be inserted and fixed into the filter holder, and the filter holder comprises a fixing protrusion fixed to the fixing groove to allow the filter to be attachable to or detachable from the filter holder.

\* \* \* \* \*

UNITED STATES PATENT AND TRADEMARK OFFICE
CERTIFICATE OF CORRECTION

PATENT NO. : 11,471,802 B2
APPLICATION NO. : 16/846963
DATED : October 18, 2022
INVENTOR(S) : Wan-Ku Kang et al.

It is certified that error appears in the above-identified patent and that said Letters Patent is hereby corrected as shown below:

In the Claims

Column 11, Line 49:
In Claim 1, delete "guide;" and insert --guide,--.

Column 12, Line 21:
In Claim 5, delete "the a" and insert --the--.

Column 12, Line 23:
In Claim 5, delete "the a" and insert --the--.

Column 12, Line 64:
In Claim 9, delete "supported," and insert --supported--.

Column 13, Line 1:
In Claim 9, delete "inserted" and insert --inserted,--.

Column 13, Line 6:
In Claim 10, delete "push," and insert --pusher,--.

Column 14, Line 14:
In Claim 16, delete "inserted;" and insert --inserted,--.

Signed and Sealed this
Thirty-first Day of January, 2023

Katherine Kelly Vidal
*Director of the United States Patent and Trademark Office*